Patented Dec. 31, 1940

2,226,599

UNITED STATES PATENT OFFICE 2,226,599

ESTERS OF GLYCOL ETHERS AND PROCESS FOR PREPARING THEM

Glenn F. Zellhoefer, Bloomington, and Carl S. Marvel, Urbana, Ill.; said Marvel assignor to said Zellhoefer No Drawing. Application November 17, 1937, Serial No. 175,086

6 Claims. (Cl. 260—484)

The present invention relates to certain new organic compounds useful for various industrial purposes, for example, as solvents, plasticizers, etc. It also relates to a method of manufacturing such compounds.

Broadly stated, the object of the present invention is to provide a series or group of new compounds which are characterized by unusual solvent capacity.

More particularly, the object is to provide a group of compounds of the character described, which contain, within their molecular structure, a plurality of what may be termed "active solvent groups."

A further object is to provide a series of new compounds which are both ethers and esters, whereby certain desirable solvent characteristics associated with each type of linkage may be obtained in a single molecular species.

A still further object is to prepare a group of new alkylene glycol ester-poly-ethers, and to provide a method for the manufacture of such compounds.

Other objects will be apparent as the invention is hereinafter more fully described.

The foregoing and other objects may be accomplished in accordance with the present invention, one aspect of which comprises a group or series of ester-poly-ethers, namely, the alkoxy alkanoic esters of the mono- and poly-alkylene glycol mono alkyl ethers, which may be represented by the general formula:

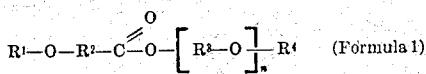

where $R^1$ and $R^4$ are alkyl groups, either the same or different; $R^2$ and $R^3$ are alkylene groups, either the same or different; and $n$ is a positive whole number.

For the purpose of disclosing more clearly the principles of the present invention, it will be convenient to discuss a representative sub-group of compounds included within the scope of the present invention. For this purpose, the sub-group wherein $R^3$ in Formula 1 above is an ethylene group will be of particular interest, in view of the fact that the various ethylene glycol derivatives which may be used as the starting materials for the synthesis thereof, are available in commercial quantities at the present time. It should be remembered, however, that this particular sub-group is selected merely as an example of the type of compounds contemplated by the present invention, and solely for the purpose of illustrating, by means of specific examples, the basic principles which are broadly applicable to the class as a whole. In other words, the invention is not restricted to this particular sub-class.

The sub-group of ethylene glycol derivatives included within the scope of the present invention may be represented by the general formula:

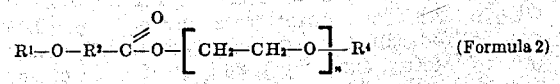

where $R^1$, $R^2$, $R^4$ and $n$ are the same as the corresponding groups in Formula 1. Of these compounds, the alkoxy-acetates represented by the formula:

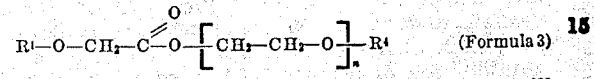

are typical members of the sub-class, and will serve to illustrate not only the compounds represented by Formula 2, but also those defined by Formula 1. The preferred embodiments of the present invention comprise the methoxy acetates ($R^1$ in Formula 3=methyl) and the ethoxy acetates ($R^1$ in Formula 3=ethyl), for the reason that these particular compounds may be prepared from the potentially cheap acids, methoxy-acetic acid and ethoxy-acetic acid, and therefore these compounds are inherently capable of being economically produced on a very large industrial scale.

In the following description, certain specific examples of compounds which may be prepared from readily available raw materials will be described. However, as above pointed out, it should constantly be borne in mind that these specific examples are illustrative, rather than restrictive, of the scope of the present invention, since it is evident that the other compounds represented by Formula 1 above and contemplated by the present invention, may be prepared in a manner similar to the synthetic methods hereinafter more particularly described with reference to the following specific examples.

EXAMPLE 1

MONO ETHYLENE GLYCOL MONO BUTYL ETHER MONO METHOXY ACETATE (In Formula 3, $R^1$=methyl, $R^4$=butyl, and $n$=1)

In a 200-cc. round-bottomed flask provided with a reflux condenser were placed 23.6 g. (0.2 mol) of mono ethylene glycol mono butyl ether ("Butyl Cellusolve"), 16 g. (0.2 mol) of dry pyridine and 75 cc. of dry chloroform. Over a period of about twenty minutes, 24 g. (0.22 mol) of methoxy acetyl chloride was added through the condenser. The reaction mixture was refluxed for one hour on a water bath.

The cooled reaction mixture was washed, first, with 75 cc. of cold, 5% hydrochloric acid, then with 75 cc. of 5% sodium bicarbonate solution, and finally with 75 cc. of water. The chloroform was removed by distillation at atmospheric pressure. The residue was distilled at 15 mm. from a modified Claisen flask. The yield of mono ethylene glycol mono butyl ether mono methoxy acetate was 16 g. or 42% of the theoretical. B. P.=123°–125° at 15 mm.;

$$n_D^{20} = 1.4242$$

*Anal.*—Calcd. for $C_9H_{17}O_4$: C, 56.80; H, 9.54. Found: C, 56.34; H, 9.14.

EXAMPLE 2

DI ETHYLENE GLYCOL MONO METHYL ETHER MONO METHOXY ACETATE (In Formula 3, $R^1$=methyl; $R^4$=methyl, and $n=2$)

In a 500-cc. round-bottomed flask provided with a reflux condenser were placed 54 g. (0.45 mol) of redistilled di ethylene glycol mono methyl ether ("Methyl Carbitol"), 36 g. (0.45 mol) of dry pyridine, and 150 cc. of dry chloroform. 55 g. (0.5 mol) of methoxy acetyl chloride was added slowly through the condenser and the reaction mixture was then warmed in a water bath for one hour. After cooling, the solution was washed, first, with 100 cc. of 5% hydrochloric acid, then with 100 cc. of 5% sodium carbonate solution, and finally with 100 cc. of water. The chloroform was removed under reduced pressure and the residue distilled under vacuum. The amount of product obtained was 48.5 g., or 56% of the theoretical yield. B. P. 145°–149° at 15 mm.

*Anal.*—Calcd. for $C_8H_{16}O_5$: C, 50.00; H, 8.33. Found: C, 50.02; H, 8.17.

EXAMPLE 3

DI ETHYLENE GLYCOL MONO ETHYL ETHER MONO METHOXY ACETATE (In Formula 3, $R^1$=methyl, $R^4$=ethyl, and $n=2$)

In a 1 l. round-bottomed flask provided with a reflux condenser were placed 49 g. (0.62 mol) of dry pyridine, 82 g. (0.61 mol) of di ethylene glycol mono ethyl ether ("Carbitol") (B. P. 198°/749 mm.) and 300 cc. of dry chloroform. Then 83 g. (0.765 mol) of methoxy acetyl chloride was slowly added. After the initial spontaneous reaction had slowed down, the reaction mixture was heated on the steam cone for about one hour. The chloroform solution was cooled and washed, first with 100 cc. of 5% hydrochloric acid solution, then with 100 cc. of 5% sodium carbonate solution, and finally with 100 cc. of water. The chloroform was removed and the residue distilled under reduced pressure. The portion boiling at 128–132° at 7 mm. weighed 108 g., corresponding to a yield of 86% of the theoretical.

*Anal.*—Calcd. for $C_9H_{18}O_5$: C, 52.42; H, 8.74. Found: C, 51.65; H, 8.83.

EXAMPLE 4

DI ETHYLENE GLYCOL MONO ETHYL ETHER MONO ETHOXY ACETATE (In Formula 3, $R^1$=ethyl, $R^4$=ethyl, and $n=2$)

In a 500-cc. round-bottomed flask provided with a reflux condenser were placed 41 g. (0.31 mol) of di ethylene glycol mono ethyl ether ("Carbitol") (B. P. 186–188°), 25 g. (0.32 mol) of dry pyridine, and 150 cc. of dry chloroform. Through the condenser 49 g. (0.4 mol) of ethoxy acetyl chloride was added and finally the reaction mixture was warmed for one hour in a water bath. The solution was washed successively with 100 cc. of 5% hydrochloric acid, 100 cc. of 5% sodium carbonate solution, and 100 cc. of water. The chloroform was removed under reduced pressure and the residue distilled. The fraction boiling between 155°–160° at 15 mm., amounted to 32 g. or 50% of the theoretical amount. Another smaller run gave a yield of 70%.

*Anal.*—Calcd. for $C_{10}H_{20}O_5$: C, 54.54; H, 9.09. Found: C, 54.75; H, 8.85.

In the foregoing detailed description of preferred embodiments of the present invention, it will be readily apparent to anyone skilled in the art that many variations may be made without departing from the spirit and scope thereof. Thus, alkoxy-alkanoyl halides other than those employed in the specific examples given above may be substituted if desired; for example, in place of methoxy acetyl chloride, propoxy acetyl chloride, butoxy acetyl chloride, and the higher alkoxy alkanoyl halides may be used to prepare the corresponding esters. Likewise, it will be apparent that other mono and poly alkylene glycol mono alkyl ethers could be used in place of the particular ethylene glycol derivatives given in the example. Moreover, in the preparation of any particular compound included within the scope of the present invention, it may be preferred to employ other inert solvents besides chloroform; and other compounds besides pyridine for removing the hydrogen halide evolved in the reaction, such as other nitrogenous bases, for example, any compound of the pyridine class. After a few experimental runs, the operator may readily determine the optimum conditions in respect to time, temperature, solvent, rate of addition, etc., for the synthesis of any particular member of the class contemplated by the present invention. Many other variations in detail will also be apparent to anyone skilled in the art, after a mastery of the principles of the present invention, as set forth in the foregoing description. The present invention is therefore to be restricted only in accordance with the hereunto appended patent claims.

The term "an alkylene glycol" as employed in the present specification and in the appended claims is to be understood to include not only the mono alkylene glycol derivatives specified in the context, but also the poly alkylene glycol derivative corresponding thereto. Likewise, the term "an ethylene glycol" includes not only the mono ethylene glycol derivative specified in the context, but also the various poly ethylene glycol derivatives corresponding thereto.

We claim:

1. A compound having the structural formula:

$$R^1\text{---}O\text{---}R^2\text{---}CO\text{---}O\text{---}(CH_2\text{---}CH_2\text{---}O)_n\text{---}R^3$$

where $R^1$ and $R^3$ are lower alkyl groups; $R^2$ is a normal lower alkylene group; and $n$ is a small positive whole number.

2. A compound having the structural formula $$R^1\text{---}O\text{---}CH_2\text{---}CO\text{---}O\text{---}[CH_2\text{---}CH_2\text{---}O]_n\text{---}R^2$$

where $R^1$ is selected from the group consisting of methyl and ethyl radicals, $R^2$ is a normal lower alkyl group, and $n$ is a small positive whole number.

3. A compound having the structural formula $$R^1-O-CH_2-CO-O-[CH_2-CH_2-O]_n-R^2$$

where $R^1$ and $R^2$ are normal lower alkyl groups and $n$ is a small positive whole number.

4. A compound having the structural formula $$R^1-O-R^2-CO-O-[CH_2-CH_2-O]_n-R^3$$

where $R^1$ and $R^3$ are normal lower alkyl groups, $R^2$ is a normal lower alkylene group, and $n$ is a small positive whole number.

5. A method of preparing a compound having the structural formula $$R^1-O-CH_2-CO-O-[CH_2-CH_2-O]_n-R^2$$

where $R^1$ and $R^2$ are normal lower alkyl groups and $n$ is a small positive whole number, which process comprises reacting an ethylene glycol mono lower normal alkyl ether with a lower normal alkoxy-acetyl halide and removing the hydrogen halide evolved in said reaction.

6. A method of preparing a compound having the structural formula $$R^1-O-CH_2-CO-O-[CH_2-CH_2-O]_n-R^2$$

where $R^1$ and $R^2$ are normal lower alkyl groups and $n$ is a small positive whole number, which process comprises reacting substantially the equivalent amounts of ethylene glycol mono lower normal alkyl ether and a lower normal alkoxy-acetyl halide in an inert solvent, in the presence of a compound having the pyridine nucleus, to remove the hydrogen halide evolved in said reaction.

GLENN F. ZELLHOEFER.
CARL S. MARVEL.